(12) United States Patent
Chang

(10) Patent No.: US 8,049,444 B2
(45) Date of Patent: Nov. 1, 2011

(54) SOFT-START CIRCUIT

(75) Inventor: Jun-Jong Chang, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 454 days.

(21) Appl. No.: 12/264,920

(22) Filed: Nov. 5, 2008

(65) Prior Publication Data

US 2010/0033117 A1 Feb. 11, 2010

(30) Foreign Application Priority Data

Aug. 5, 2008 (CN) .......................... 2008 1 0303387

(51) Int. Cl.
*H02P 3/14* (2006.01)
*H02M 5/458* (2006.01)

(52) U.S. Cl. .................. 318/376; 318/778; 318/400.11; 363/34; 363/37

(58) Field of Classification Search ............ 318/400.11, 318/800, 375, 376, 778; 363/34, 37, 16, 363/20, 21.04, 21.08, 55, 56.01, 56.12, 97, 363/116, 137; 320/137, 138, 166
See application file for complete search history.

(56) References Cited

U.S. PATENT DOCUMENTS

| | | | | |
|---|---|---|---|---|
| 4,209,826 A | * | 6/1980 | Priegnitz | 363/21.07 |
| 4,233,557 A | * | 11/1980 | Alberkrack | 323/283 |
| 5,982,638 A | * | 11/1999 | Tang et al. | 363/21.1 |
| 6,314,002 B1 | * | 11/2001 | Qian et al. | 363/21.04 |
| 7,135,835 B2 | * | 11/2006 | Yamada et al. | 318/800 |
| 2009/0086515 A1 | * | 4/2009 | Sakakibara | 363/37 |
| 2010/0090625 A1 | * | 4/2010 | Nagashima et al. | 318/376 |
| 2010/0127647 A1 | * | 5/2010 | Huang et al. | 318/400.11 |
| 2010/0246217 A1 | * | 9/2010 | Sakakibara | 363/37 |
| 2010/0321965 A1 | * | 12/2010 | Sakakibara | 363/37 |
| 2011/0025246 A1 | * | 2/2011 | Sakakibara | 318/400.42 |

OTHER PUBLICATIONS

J.Schoenberger et al., "An Ultra Sparse Matrix Converter with a Novel Active Clamp Circuit", Proc. of the 4th power conversion conference (PCC '07), pp. 784-791.*

* cited by examiner

*Primary Examiner* — Eduardo Colon Santana
(74) *Attorney, Agent, or Firm* — Altis Law Group, Inc.

(57) ABSTRACT

A soft-start circuit includes a power source, a switch, a capacitor and a regeneration brake circuit. The regeneration brake circuit absorbs a return current. The regeneration brake circuit includes a resistor, a diode and a transistor. The resistor is connected between two poles of the power source via the transistor. The diode is connected between the resistor and the positive pole of the power source via the switch. The capacitor is connected between the negative pole of the diode and the transistor. The switch is connected between the negative pole of the diode and resistor. When the switch turns off, the power charges the capacitor via the resistor and the diode of the regeneration brake circuit. When the switch turns on, the return current turns the transistor on, and the resistor absorbs the return current.

6 Claims, 3 Drawing Sheets

SOFT-START CIRCUIT

BACKGROUND

1. Technical Field

The present disclosure relates to start circuits and, particularly, to a soft-start circuit for a servo motor.

2. Description of Related Art

Referring to FIG. 3, a soft-start circuit in a driver of a motor provides slow boot up for the driver of the motor. The soft-start circuit includes a resistor R0, a capacitor C0, a switch J0, and a DC power source Vdc. In charging the capacitor C0, the switch J0 is opened, and the DC power source Vdc charges the capacitor C0 via the resistor R0. When the voltage of the capacitor C0 approaches the voltage of the DC power source Vdc, the switch J0 is closed, and the DC power source Vdc charges the capacitor C0 via the switch J0. The resistor R0 slowly charges the capacitor C0. The capacitor C0 is protected from transient currents, because the current of the DC power source Vdc is limited by $$\frac{Vdc}{R0}.$$

However, the resistor R0 of the soft-start circuit is only used once during a soft-start process, thus affecting efficiency.

What is needed, therefore, is a soft-start circuit which can address the described limitations.

DETAILED DESCRIPTION

Figure 1:
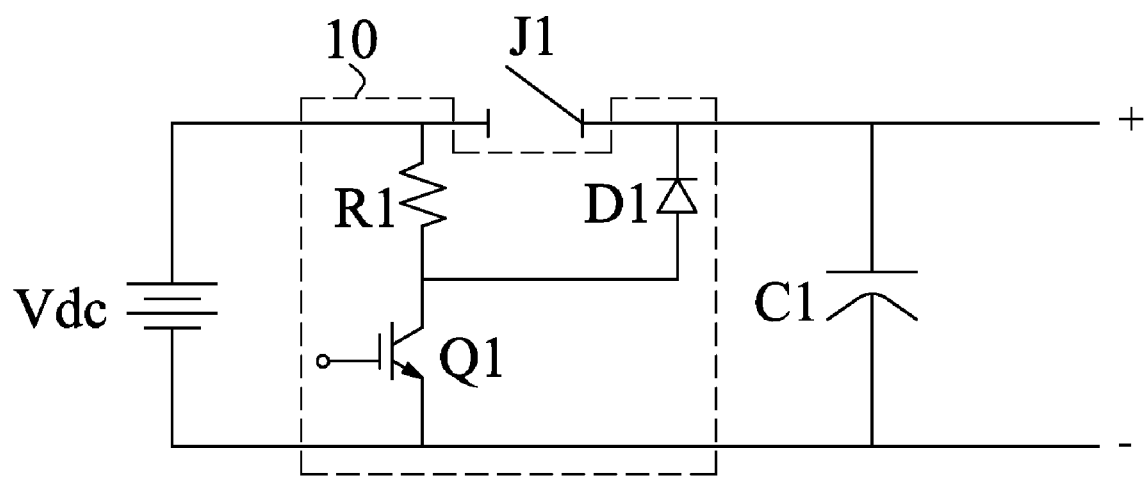
FIG. 1 is a circuit diagram of an embodiment of a soft-start circuit, with a switch open.

Referring to FIG. 1, an exemplary embodiment of a soft-start circuit in a driver of a motor includes a power source Vdc, a regeneration brake circuit 10, a capacitor C1, and a switch J1. The regeneration brake circuit 10 includes a resistor R1, a diode D1, and a transistor Q1. Here, the transistor Q1 is an insulated gate bipolar transistor (IGBT). A first end of the resistor R1 is connected to a positive pole of the power source Vdc. A second end of the resistor R1 is connected to the collector of the transistor Q1. The emitter of the transistor Q1 is connected to a negative pole of the power source Vdc. An anode of the diode D1 is connected to the second end of the resistor R1. A cathode of the diode D1 is connected to the positive pole of the power source Vdc via the switch J1. A first end of the capacitor C1 is connected to the cathode of the diode D1. A second end of the capacitor C1 is connected to the emitter of the transistor Q. A control signal is input through the base of the transistor Q1, controlling the transistor Q1.

The regeneration brake circuit 10 is an open circuit when the switch J1 is open. Current from the power source Vdc charges the capacitor C1 via the resistor R1 and the diode D1. When the voltage of the capacitor C1 approaches that of the power source Vdc, the switch J1 is closed. The capacitor C1 is not easily damaged by a transient current, because the current of the power source Vdc is limited by $$\frac{Vdc}{R1}.$$

As a result, transient current remains small, and damage to the capacitor C1 is avoided.

Figure 2:
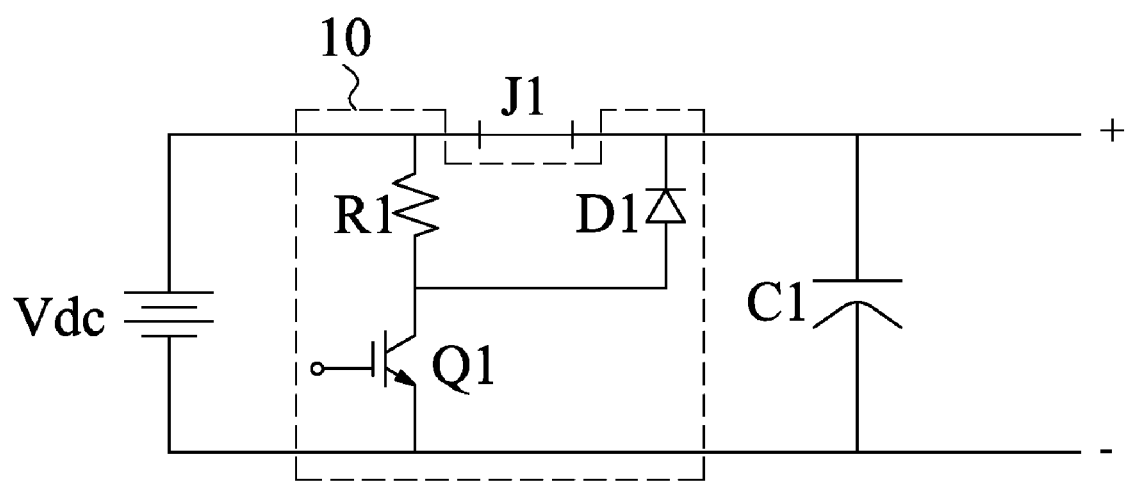
FIG. 2 is similar to FIG. 1, but shows the switch closed.
Figure 3:
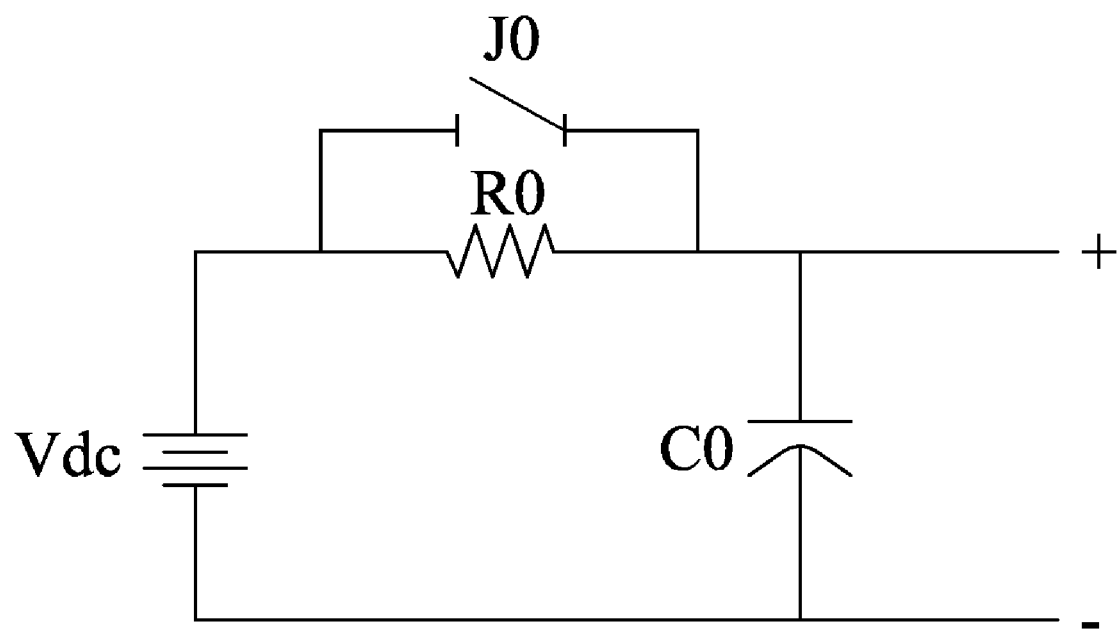
FIG. 3 is a circuit diagram of a related-art soft-start circuit.

Referring to FIG. 2, when the switch J1 is closed, the regeneration brake circuit 10 is a closed circuit. Current from the power source Vdc further charges the capacitor C1 through the switch J1.

The soft-start circuit is connected to a motor (not shown) through a convertor (not shown). When the motor brakes, a counter-electromotive force of the motor generates a return current to the soft-start circuit. If the voltage of the return current exceeds the default current of the transistor Q1, the transistor Q1 turns on. The resistor R1 absorbs the return current. As a result, damage to the soft-start circuit by the return current from the motor is avoided.

It should be noted that the regeneration brake circuit 10 and the soft-start circuit share the resistor R1, which reduces cost.

It is to be understood that the above-described embodiments are intended to illustrate rather than limit the disclosure. Variations may be made to the embodiment without departing from the spirit of the disclosure as claimed. The above-described embodiments illustrate the scope of the disclosure but do not restrict the scope of the disclosure.

What is claimed is:

1. A soft-start circuit comprising:
   a dc power source;
   a capacitor;
   a switch; and
   a regeneration brake circuit directly connected to the dc power source and configured to absorb a return current, comprising a resistor, a diode, and a transistor, wherein a first end of the resistor is connected to a positive pole of the dc power source, a second end of the resistor is connected to a negative pole of the dc power source via the transistor, a positive pole of the diode is connected to the second end of the resistor, a negative pole of the diode is connected to the positive pole of the dc power source via the switch, one end of the capacitor is connected to the negative pole of the diode, the other end of the capacitor is connected to the transistor, one end of the switch is connected to the resistor, and the other end of the switch is connected to the negative pole of the diode, whereby when the switch turns off, the dc power source charges the capacitor via the resistor and the diode of the regeneration brake circuit, and when the switch turns on, the return current turns the transistor on, and the resistor absorbs the return current.

2. The soft-start circuit as claimed in claim 1, wherein the transistor of the regeneration brake circuit is an insulated gate bipolar transistor.

3. The soft-start circuit as claimed in claim 2, wherein the emitter of the transistor is connected to the negative pole of the dc power source; the collector of the transistor is connected to the second end of the resistor; and the base of the transistor is for control signal input.

4. A soft-start circuit comprising:
   a capacitor;
   a switch; and
   a regeneration brake circuit directly connected to a dc power source and configured to absorb a return current, comprising a resistor, a diode and a transistor, and wherein a first end of the resistor is connected to a positive pole of the dc power source, a second end of the resistor is connected to a negative pole of the dc power source via the transistor, a positive pole of the diode is connected to the second end of the resistor, a negative pole of the diode is connected to the positive pole of the dc power source via the switch, one end of the capacitor is connected to the negative pole of the diode, the other end of the capacitor is connected to the transistor, one end of the switch is connected to the resistor, and the other end of the switch is connected to the negative pole of the diode, whereby, when the switch turns off, the dc power source charges the capacitor via the resistor and the diode of the regeneration brake circuit, and when the switch turns on, the return current turns the transistor on, and the resistor absorbs the return current.

5. The soft-start circuit as claimed in claim 4, wherein the transistor of the regeneration brake circuit is an insulated gate bipolar transistor.

6. The soft-start circuit as claimed in claim 5, wherein the emitter of the transistor is connected to the negative pole of the dc power source; the collector of the transistor is connected to the second end of the resistor; and the base of the transistor is for control signal input.

* * * * *